(12) United States Patent
Mademba-Sy et al.

(10) Patent No.: US 6,717,321 B2
(45) Date of Patent: Apr. 6, 2004

(54) ELECTRIC MOTOR COMPRISING IMPROVED MEANS OF FIXING AN END FLANGE TO A STATOR SHELL

(75) Inventors: Thierry Mademba-Sy, Conde-sur-Notreau (FR); David Da Silva, Alben (FR); Michel Lehir, Caen (FR)

(73) Assignee: Meritor Light Vehicle Systems - France (FR)

( * ) Notice: Subject to any disclaimer, the term of this patent is extended or adjusted under 35 U.S.C. 154(b) by 0 days.

(21) Appl. No.: 09/947,934

(22) Filed: Sep. 6, 2001

(65) Prior Publication Data

US 2002/0057025 A1 May 16, 2002

(30) Foreign Application Priority Data

Sep. 6, 2000 (FR) .............................. 00 11365

(51) Int. Cl.$^7$ .............................. H02K 13/00
(52) U.S. Cl. ......................... 310/239; 310/89
(58) Field of Search ................ 310/89, 239, 240, 310/241, 242

(56) References Cited

U.S. PATENT DOCUMENTS

| | | |
|---|---|---|
| 3,739,205 A | 6/1973 | Winkelmann |
| 5,495,134 A * | 2/1996 | Rosenblum .................. 310/239 |

FOREIGN PATENT DOCUMENTS

| | | | |
|---|---|---|---|
| DE | 37 31 409 A | 4/1989 | |
| EP | 0 305 915 | * 8/1988 | ............ H02K/5/15 |
| EP | 0 282 377 A | 9/1988 | |
| EP | 0 305 915 A | 3/1989 | |
| FR | 2 159 238 A | 6/1973 | |
| FR | 2 726 700 A | 5/1996 | |
| JP | 03285532 | * 12/1991 | ............ 310/40 MM |

OTHER PUBLICATIONS

French Search Report dated May 30, 2001.

\* cited by examiner

*Primary Examiner*—Burton S. Mullins
*Assistant Examiner*—Nguyen Hanh
(74) *Attorney, Agent, or Firm*—Carlson, Gaskey & Olds

(57) ABSTRACT

An electric motor comprising a rotor secured to a shaft, a stator comprising a cylindrical shell receiving at one at least of the ends a flange provided with a roller bearing for the rotor shaft, the flange being fixed to the cylindrical shell by a fixing means having a bayonet-type assembly, wherein the assembling of the flange onto the shell being achieved through a relative displacement in an axial translation and a rotary relative motion.

14 Claims, 5 Drawing Sheets

ELECTRIC MOTOR COMPRISING IMPROVED MEANS OF FIXING AN END FLANGE TO A STATOR SHELL

BACKGROUND OF THE INVENTION

The present invention relates to an electric motor, in particular a DC motor.

The state of the art already discloses numerous electric motors comprising a cylindrical shell receiving at one at least of its ends a casing end flange provided with a roller bearing for the rotor shaft, the said flange being fixed to the cylindrical shell by fixing means.

However, these motors have a certain number of drawbacks, especially related to the mode of fixing the flanges onto the shell.

Specifically, generally, the end flanges are assembled and fixed onto the stator shell by crimping. The ends of the shell receiving the flanges are therefore deformed permanently, thereby degrading the magnetic performance of the stator and requiring complex crimping equipment on the motor assembly line.

In other cases, the flanges are screwed onto the shell, thereby increasing the number of components of the motor, the assembly time and the tooling cost.

A main aim of the invention is to remedy these drawbacks, and to propose an electric motor of the aforesaid type whose cost of assemblage is reduced and whose performance is not degraded on account of the assemblage operation.

SUMMARY OF THE INVENTION

According to the invention, the fixing means comprise a bayonet-type assembly, the assembling of the flange onto the shell being achieved through a relative displacement in axial translation and a rotary relative motion.

According to other characteristics of the invention:

the bayonet assembly comprises an L-shaped guidance aperture formed in the peripheral wall of the shell, and a complementary pin secured to the flange, the fixing means comprise an elastic locking member intended for the relative rotational tying of the flange and the shell, when the latter are in the position of complete assemblage, the elastic locking member comprises a flexible elastic tab carrying a lug, secured to one of the two components constituted by the flange and the shell, and cooperating with a window made in the counterpart component, and comprises a commutator secured to the rotor shaft, a brush-carrying ring supporting two brushes displaceable between a standby position separated from the commutator and an active working position in contact with the commutator, the said ring being housed in the shell in the vicinity of one of its ends the corresponding end flange comprising two axially projecting members, each of which is intended to cooperate with a respective one of two brushes, in such a way as to displace the latter from its standby position to its working position when assembling the flange onto the shell.

By virtue of this latter arrangement, the unlocking of the brushes and their movement from their standby position to their working position is achieved automatically when assemblage of the motor is complete, that is to say when the end flange is mounted on the shell.

This operation is achieved without additional tooling, with no additional component, and also without any operation time being added to the motor assemblage time.

According to yet other characteristics of the invention:

each projecting member exhibits a ramp intended to cooperate with a ridge of the corresponding brush, the ramp is configured so as to displace the corresponding brush to its working position during the relative displacement in axial translation of assemblage of the flange onto the shell, the ramp is configured so as to displace the corresponding brush to its working position during the rotary relative motion of assemblage of the flange onto the shell.

The invention is also aimed at a drive device for motor vehicle equipment, comprising an electric motor as described above.

BRIEF DESCRIPTION OF THE DRAWINGS

Exemplary embodiments of the invention will now be described in conjunction with the appended drawings, in which.

DETAILED DESCRIPTION OF THE PREFERRED EMBODIMENT

Figure 1:
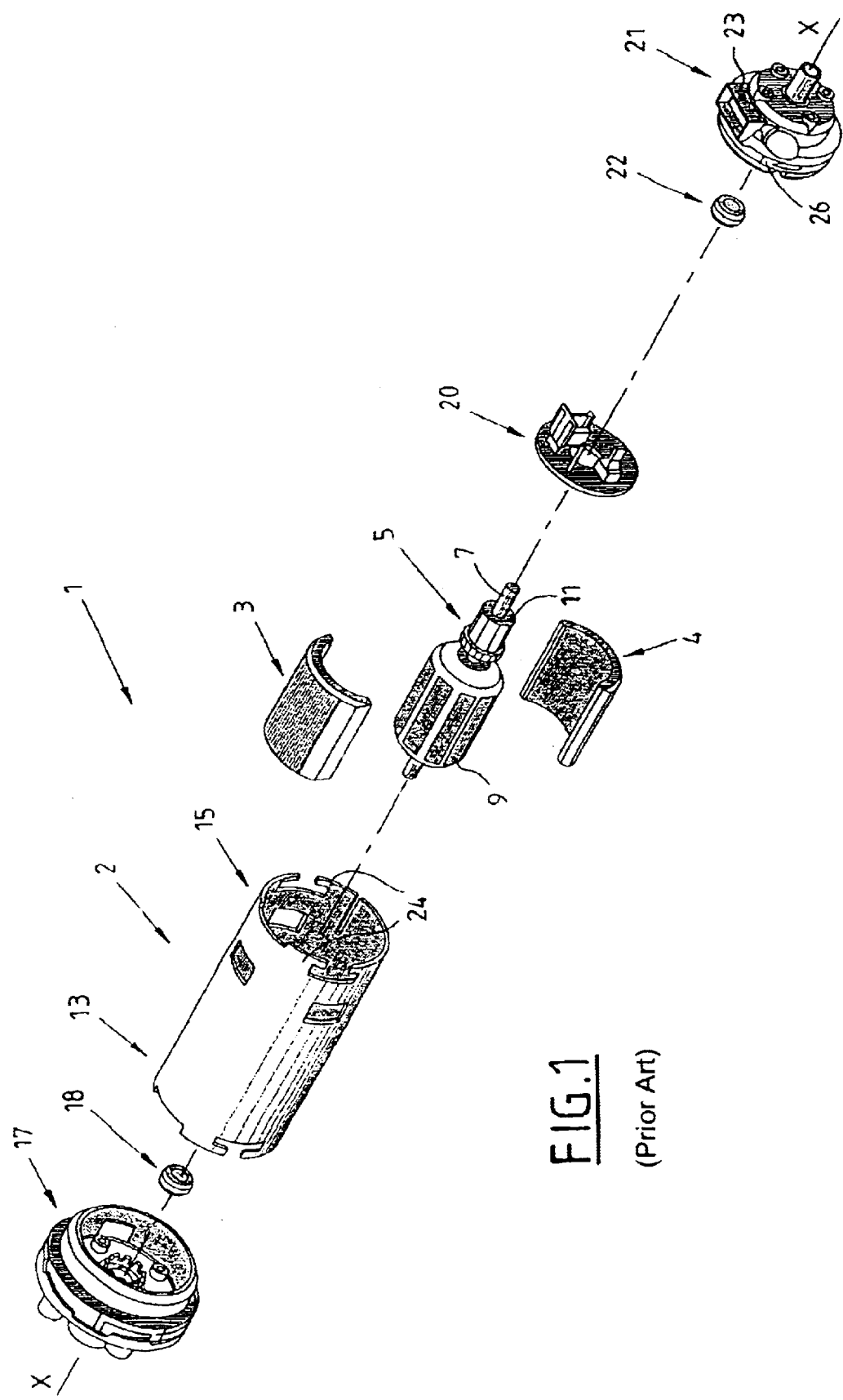
FIG. 1 is an exploded perspective view of an electric motor of known type.

FIG. 1 depicts the general structure of a DC electric motor.

This motor 1 comprises a shell 2 in which are arranged permanent magnets 3 and 4, and a rotor 5.

The rotor 5 consists in particular of a shaft 7 of axis X—X having armature windings 9 electrically energized by way of a commutator 11.

The shell has a cylindrical shape with circular section, with the same axis X—X as the rotor shaft 7, and has two open ends 13, 15.

The rear end 13 of the shell 2 is adapted to receive a rear flange 17 fitted with a guidance bearing 18 for the rotor shaft 7.

The front end 15 of this shell 2 is adapted to receive a brush-carrying ring 20, and a front flange 21 also fitted with a guidance bearing 22 for the rotor shaft 7.

The front flange 21 supports an electrical supply connector 23 and can also be designed to receive sensors or electronic cards for controlling the motor.

For a motor of the type represented, the fixing of the flange 21 onto the shell 2 is carried out by crimping, with the peripheral strips 24 being folded down into a corresponding peripheral groove 26 formed on the flange 21.

An electric motor according to the invention will now be described with reference to FIG. 2, by further detailing the front end part of the shell, the brush-carrying ring and the front flange. The other constituents described with reference to FIG. 1 are not directly relevant to the invention and it being possible to choose them, in order to carry out the invention, to be identical to those known in the state of the art.

A motor according to the invention comprises a shell 30, of which only an end piece corresponding to the front end 15 of the motor of the state of the art and represented in FIG. 1 has been represented. This shell 30 is of cylindrical shape with axis X—X, and of annular cross section. It has, emerging on its free end 32, an L-shaped aperture 34, one branch of which is axial and emerges on the free end 32. In the vicinity of the aperture 34, the shell 30 comprises a window 36.

A second aperture 34, symmetric with the first according to an axial symmetry with axis X—X, is formed in the shell 30.

A brush-carrying ring 40 is intended to be fixed in the shell 30 by fixing means (not represented). The brush-carrying ring 40 is formed of an annulus 42 that is complementary section to the shell 30. The annulus 42 supports on one of its faces two diametrically opposed studs 44. Each stud 44 exhibits the general shape of a parallelepiped in which a radially oriented likewise parallelepipedal channel 46 is formed. Each stud 44 moreover exhibits a projection in the form of a radial tooth 47, of which one face 47A (referenced in FIGS. 3a, 3B, 5A and 5B) is inclined by flaring out from the exit of the channel 46, on the opposite side to the surface of the annulus 42. The central hole 48 of the annulus 42 is intended to receive the commutator 11 of the rotor 5, that the channels 46 emerge on the peripheral surface of the commutator 11 when the motor is assembled. Each channel 46 receives a complementary brush 50 which is intended to bear on the commutator 11 via a contact face 50A (referenced in FIGS. 3A, 3B, 5A and 5B). A supporting face 50B of the brush 50, consisting of a face opposite the contact face 50A, has a notch 51 extending along a peripheral direction.

The arm 50 is associated with an elastic pressure member 52 secured to the annulus 42 by way of a respective fixing pin 54 formed as one component with the annulus 42. The elastic pressure member 52 is a spiral spring wound around the pin 54, and comprises a free end arm 52A intended to bear either on a radial face 55 (referenced in FIGS. 3A, 3B, 5A and 5B) of the brush 50, situated opposite the inclined face 47A of the tooth 47, or on its supporting face 50B while cooperating with the notch 51.

Figure 2:
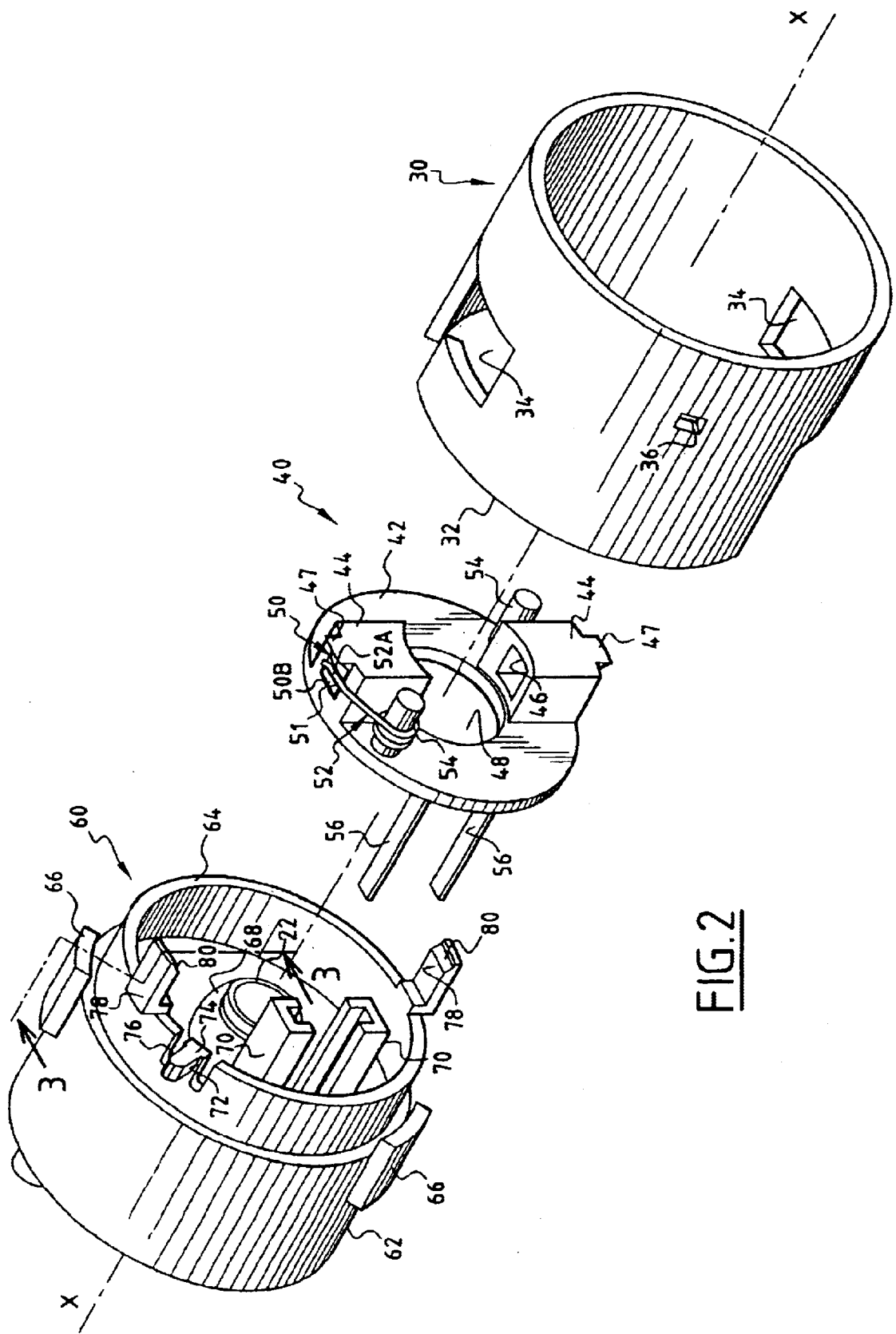
FIG. 2 is a partial exploded perspective view of an electric motor according to a first embodiment of the invention.

FIG. 2 illustrates only one of the brushes 50 and only one of the elastic pressure members 52 have been represented. The annulus 42 also supports electrical connection strips 56 formed on the opposite face of the annulus 42 with respect to the stud 44, and also constituting guidance members.

The other electrical linking members associated with the brushes 50 have not been represented since conventional arrangements are involved.

A front flange 60 intended to be fixed onto the shell 30 is also represented in FIG. 2.

The front flange 60 has two coaxial cylindrical sleeves, the first 62 constituting an outer sleeve and the second 64 constituting an inner sleeve.

The outer sleeve 62 has two diametrically opposed locking pins 66 projecting axially from the side turned towards the shell 30, these pins being of complementary shape to those of the apertures 34 so as to cooperate with them.

The flange 60 comprises a hub 68 in which is mounted a bearing 22 such as described with reference to FIG. 1, intended to rotatably receive the shaft 7 of the rotor 5.

Guidance rails 70 complementary to the strips 56 project axially from the bottom of the front flange 60 and are secured to female electrical connection members (not represented) intended to electrically energize the brushes 50 by way of the connection strips 56.

In the inner sleeve 64 is formed an axial flexible tab 72 whose free end 74 is turned towards the shell 30 and comprises a radial lug 76 intended to be inserted into the window 36 of the shell 30 after elastic deformation of the flexible tab 72, in the position of complete insertion of the locking pin 66 in the aperture 34.

The male locking members formed by the locking pins 66 and the lug 76, and the respective complementary female members formed by the apertures 34 and window 36, constitute a bayonet-type fixing assembly, in which the fixing of the front flange onto the shell 30 is achieved by axial engagement of the locking pins 66 into the apertures 34. This position is then locked by the cooperation of the lug 76 with the window 36 when the locking pins 66 abut the bottom of the apertures through relative rotation 34.

Two diametrically opposed axially projecting members 78 are formed as one component with the inner sleeve 64 and are turned towards the brush-carrying ring 40. On the brush-carrying ring 40 side, these projecting members 78, which are intended to cooperate with the respective brushes 50, have a free end provided with a ramp 80 inclined with respect to the axis of insertion of the pins 66 into the apertures 34; while being turned towards the brush-carrying ring 40. The ramp 80 is thus adapted so that the motion of axial insertion of the flange 60 with respect to the shell 30 actuates the brushes 50 in radial translation towards the axis X—X.

The mounting of the flange 60 onto the shell 30 and the placing of the brushes 50 in the working position will now be described, with reference to FIGS. 3A and 3B.

Figure 3A:
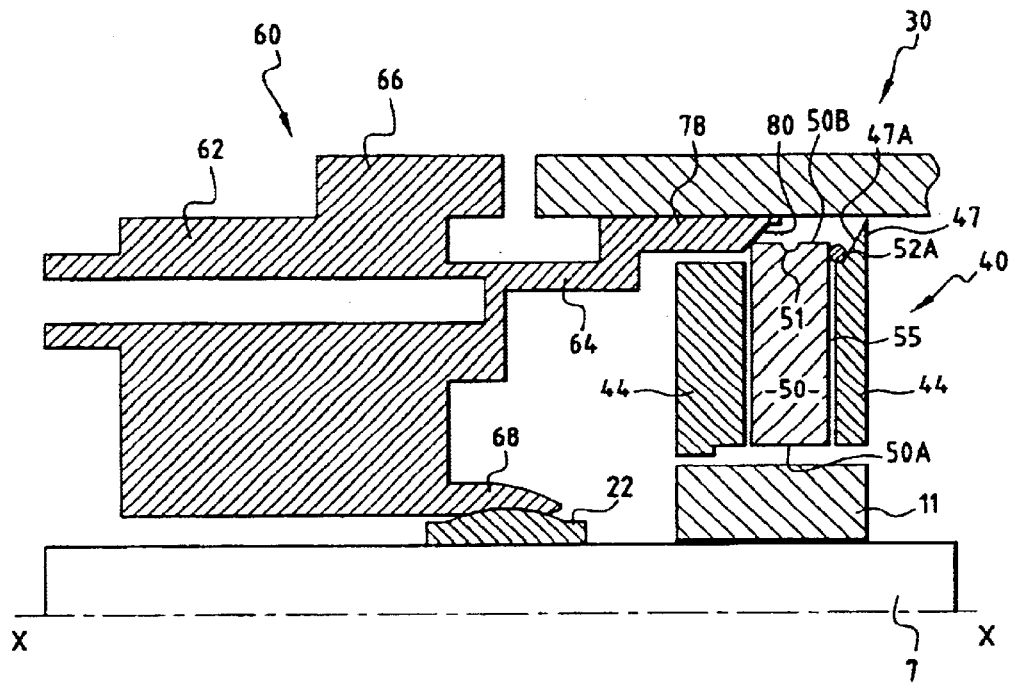
FIGS. 3A and 3B are half-sectional views along the line 3—3 of the assembly represented in FIG. 2, according to the first embodiment of the invention, respectively in the pre-assembled position and in the position of complete assemblage of the end flange onto the shell.

Represented in FIG. 3A is the assembly formed by the shell 30, the brush-carrying ring 40 and the front flange 60 in the pre-assembled position, before insertion of the locking pin 66 into the aperture 34. In this position, the brushes 50 are in the standby position separated radially from the axis X—X, allowing the mounting of the ring 40 onto the rotor shaft 7 and the suitable positioning of the said ring 40 around the commutator 11. The brushes 50 are maintained in this position by conventional mechanical catches (not represented) that provide a small retaining force. The end arm 52A of the elastic pressure member 52 is axially separated from its rest position so as to be prestressed between the inclined face 47A of the tooth 47 and the radial face 55 of the brush 50 placed opposite.

When the locking pin 66 is inserted into the aperture 34, the relative axial motion of the flange 60 with respect to the shell 30 gives rise to a supporting of the ramp 80 of the projecting member 78 on a ridge of the brush 50, and thus its radial displacement towards the axis X—X and the commutator 11. The end arm 52A of the elastic pressure member 52 is then disengaged from that face 55 of the brush 50 on which it bore, so that the said arm 52A takes up an axial position free of axial stress, this position corresponding to the engaging of the arm 52A in the notch 51 of the brush. The elastic pressure member 52 then provides a solely radial force on the brush 50, this force being greater than the retaining force provided by the mechanical catch for maintaining the brush in the standby position, so that the brush 50 is pressed onto the commutator 11 in its final working position.

Figure 3B:
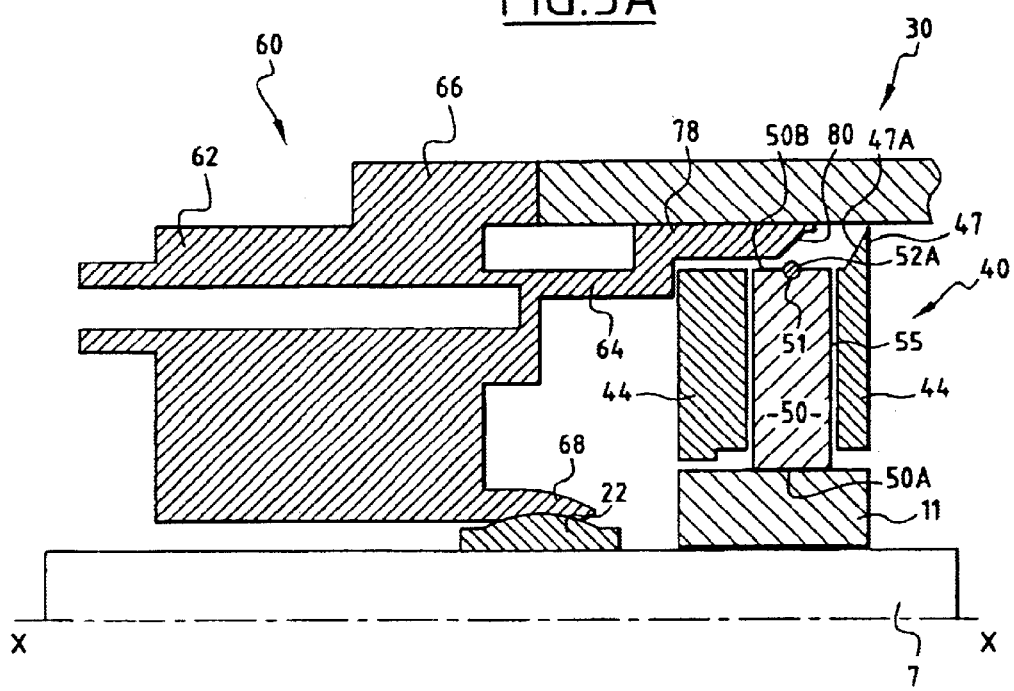

This working position has been represented in FIG. 3B.

Figure 4:
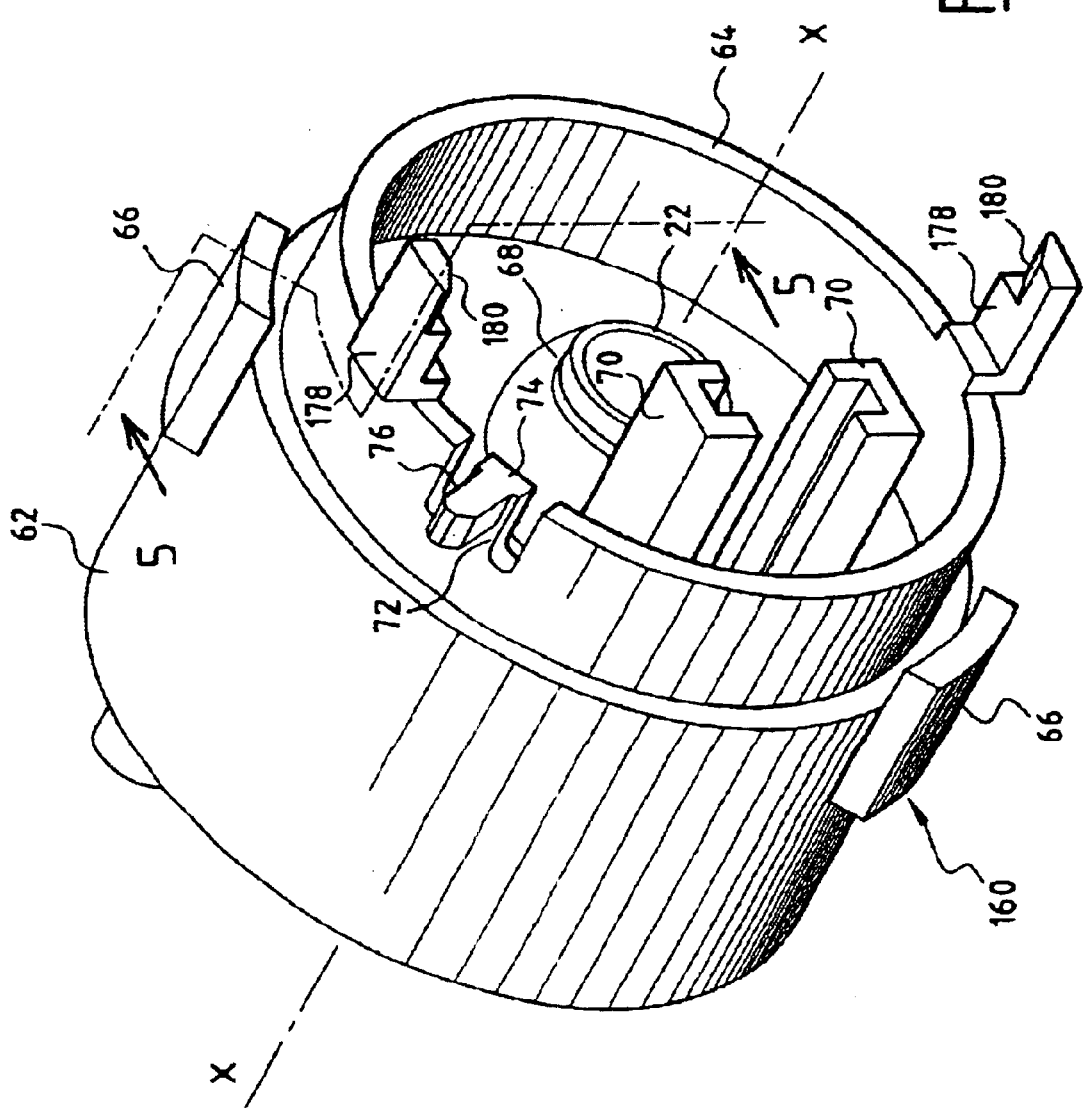
FIG. 4 is a perspective view on a larger scale, of an end flange alone, according to a second embodiment of the invention.

Represented, alone, in FIG. 4 is a front flange 160 comprising a projecting member 178 whose function is similar to that described with reference to FIGS. 2, 3A and 3B, with the sole difference that it comprises a ramp 180 inclined with respect to a plane tangential to a fictitious cylinder of circular cross section and of axis X—X, the inclination being defined by a rotation about the axis defined by the points of tangency. Therefore, it is the rotary motion of assemblage of the flange 160 with respect to the shell 30 which generates, by the supporting of the ramp 180 on a ridge of the brush 50, the radial displacement of the brush 50 towards its working position by support on the commutator 11.

Figure 5A:
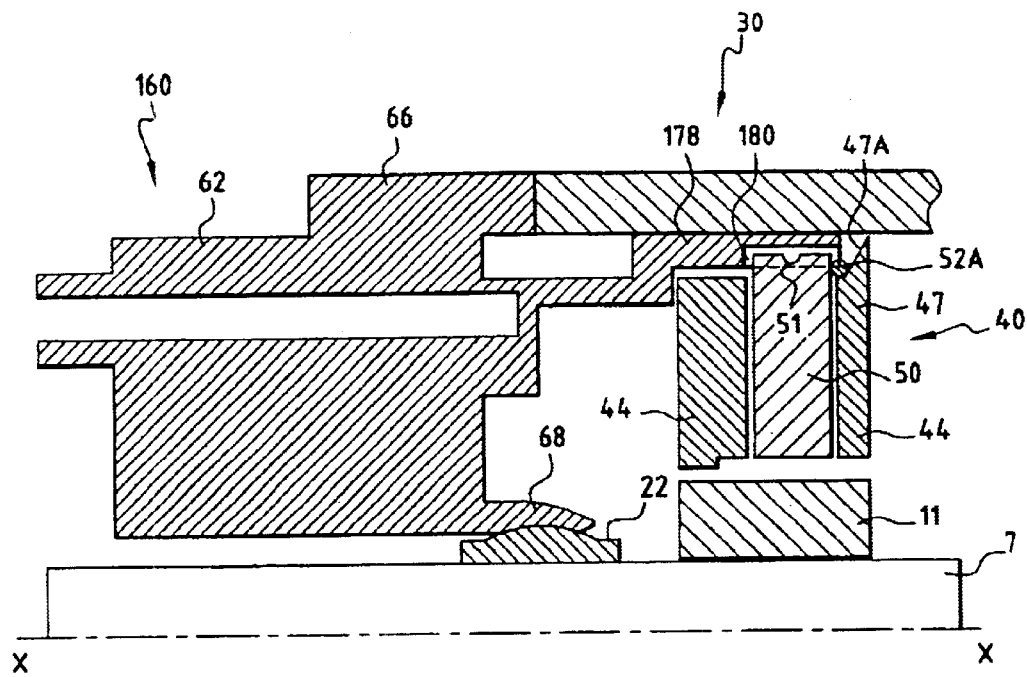
FIGS. 5A and 5B are half-sectional views along the line 5—5 indicated in FIG. 4, which are similar to FIGS. 3A and 3B.
Figure 5B:
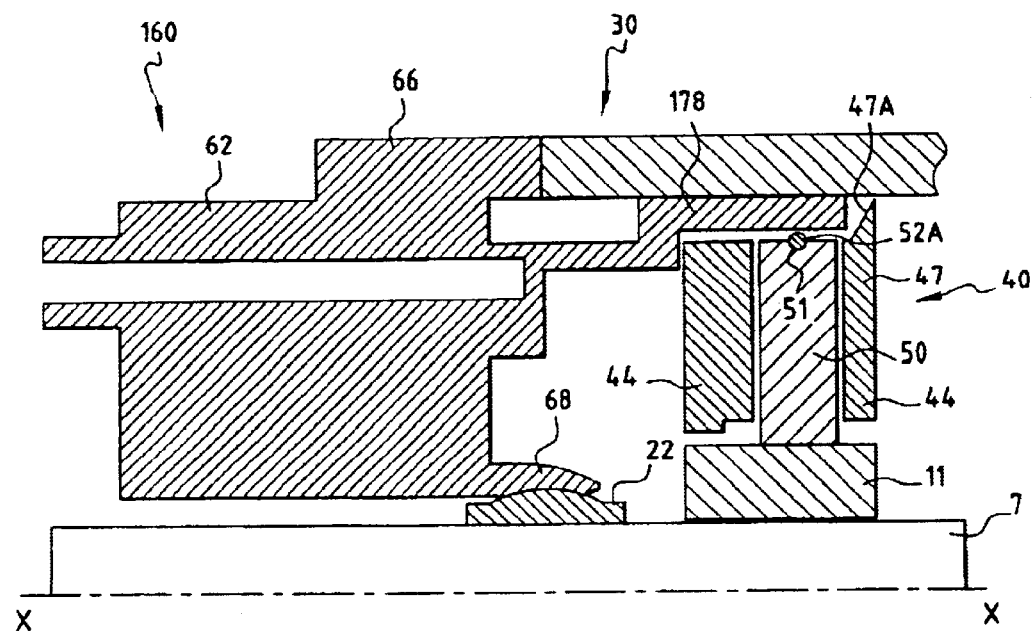

The shell 30 and the flange 160 are represented in FIG. 5A in the pre-assemblage position, in which only the axial insertion has been carried out, whilst FIG. 5B illustrates the final relative position of these same components and of the brush-carrying ring 40, when the relative rotational motion is complete.

The invention affords not only the advantage of intact magnetic performance of the stator after assemblage of the motor, but also increased ease of mounting, and hence reduced manufacturing cost.

The demounting of the motor when its life is complete, to promote the recycling thereof, is simplified in the same way.

The invention just described also makes it possible to achieve the movement of the brushes from their standby position to their working position without any additional operation with respect to the assembling of the motor and without resorting to an additional mechanical component dedicated solely to placing the brushes in position.

This results in substantially reduced time and cost of manufacture and/or of assemblage, for motors of the type aimed at by the invention.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An electric motor comprising:
    a rotor shaft;
    a rotor secured to the rotor shaft;
    a flange provided with a roller bearing for the rotor shaft;
    a stator having a cylindrical shell receiving at least one of a pair of ends of the flange, wherein the flange is fixed to the cylindrical shell by a fixing mechanism including a bayonet-type assembly that attaches the flange onto the shell through a relative displacement in an axial translation and a rotary relative motion;
    a commutator secured to the rotor shaft;
    a brush-carrying ring supporting a pair of brushes displaceable between a standby position separated from the commutator and a working position in contact with the commutator, said ring being housed in the shell proximate to one of said ends,
    wherein the flange includes a pair of axially projecting members that cooperate with said pair of brushes to displace the pair of brushes from the standby position to the working position when assembling the flange onto the shell.

2. The electric motor according to claim 1, wherein each of said pair of projecting members includes a ramp that cooperates with a ridge of a corresponding brush in said pair of brushes.

3. The electric motor according to claim 2, wherein the ramp is configured to displace the corresponding brush to said working position during the relative displacement in axial translation of assemblage of the flange onto the shell.

4. The electric motor according to claim 2, wherein the ramp is configured to displace the corresponding brush to said working position during the rotary relative motion of assemblage of the flange onto the shell.

5. The electric motor according to claim 1, wherein the bayonet-type assembly includes an L-shaped guidance aperture formed in a peripheral wall of the shell, and a complementary pin secured to the flange.

6. The electric motor according to claim 1, wherein the fixing mechanism includes at least one elastic locking member that allows relative rotational attachment, of the flange and the shell when assembled.

7. The electric motor according to claim 6, wherein the elastic locking member includes a flexible elastic tab carrying a lug secured to one of the flange and the shell, and cooperating with a window in the other of the flange and the shell.

8. A drive device for a motor vehicle equipment comprising:
    an electric motor including
        a rotor shaft,
        a rotor secured to the rotor shaft,
        a flange provided with a roller bearing for the rotor shaft,
        a stator having a cylindrical shell receiving at least one of a pair of ends of the flange, wherein the flange is fixed to the cylindrical shell by a fixing mechanism including a bayonet-type assembly that attaches the flange onto the shell through a relative displacement in an axial translation and a rotary relative motion,
        a commutator secured to the rotor shaft,
        a brush-carrying ring supporting a pair of brushes displaceable between a standby position separated from the commutator and a working position in contact with the commutator, said ring being housed in the shell proximate to one of said pair of ends,
        wherein the flange includes a pair of axially projecting members each intended to cooperate with one of said pair of brushes, to displace the pair of brushes from the standby position to the working position when assembling the flange onto the shell.

9. The electric motor according to claim 8, wherein each of said pair of projecting members includes a ramp that cooperates with a ridge of a corresponding brush in a pair of brushes.

10. The electric motor according to claim 9, wherein the ramp is configured to displace the corresponding brush to said working position during the relative displacement in axial translation of assemblage of the flange onto the shell.

11. The electric motor according to claim 9, wherein the ramp is configured to displace the corresponding brush to said working position during the rotary relative motion of assemblage of the flange onto the shell.

12. The electric motor according to claim 8, wherein the bayonet assembly includes an L-shaped guidance aperture formed in a peripheral wall of the shell, and a complementary pin secured to the flange.

13. The electric motor according to claim 8, wherein the fixing mechanism includes at least one elastic locking member that allows relative rotational attachment of the flange and the shell when assembled.

14. The electric motor according to claim 13, wherein the elastic locking member includes a flexible elastic tab carrying a lug secured to one of the flange and the shell, and cooperating with a window in the other of the flange and the shell.

* * * * *

UNITED STATES PATENT AND TRADEMARK OFFICE
CERTIFICATE OF CORRECTION

PATENT NO. : 6,717,321 B2
DATED : April 6, 2004
INVENTOR(S) : Mademba-Sy et al.

It is certified that error appears in the above-identified patent and that said Letters Patent is hereby corrected as shown below:

Title page,
Item [75], Inventors, the residence of "Thierry Mademba-Sy" should read as
-- Conde-sur-Noireau (FR) --

Column 6,
Line 55, "a" should read as -- said --

Signed and Sealed this

Twenty-second Day of February, 2005

JON W. DUDAS
*Director of the United States Patent and Trademark Office*